J. H. DE SMIDT.
SPRING WHEEL.
APPLICATION FILED NOV. 15, 1916.

1,239,891.

Patented Sept. 11, 1917.

Witnesses

Inventor
J. H. De Smidt
By D. Swift & Co.
Attorneys

UNITED STATES PATENT OFFICE.

JACOBUS H. DE SMIDT, OF SHEBOYGAN, WISCONSIN.

SPRING-WHEEL.

1,239,891.  Specification of Letters Patent. Patented Sept. 11, 1917.

Application filed November 15, 1916. Serial No. 131,533.

*To all whom it may concern:*

Be it known that I, JACOBUS H. DE SMIDT, a citizen of the United States, residing at Sheboygan, in the county of Sheboygan, State of Wisconsin, have invented a new and useful Spring-Wheel; and I do hereby declare the following to be a full, clear, and exact description of the invention, such as will enable others skilled in the art to which it appertains to make and use the same.

This invention relates to an improved resilient wheel, and an object of the invention is to provide a wheel comprising improved simple and efficient features of construction.

One of the features of construction is the provision of an outer rim for the usual tire and an innermost rim, there being a multiple of rings interposed and provided with spacing members in staggered relations, whereby the various rings beyond the inner rim will yield relative to each other, said multiple of rings being constructed of a resilient metal.

Another feature of the invention is the provision of means, whereby the spacing members may be easily inserted and removed, and adjusted in different positions.

In practical fields, the details of construction may necessitate alterations falling within the scope of what is claimed.

The invention comprises further features and combination of parts, as hereinafter set forth, shown in the drawings, and claimed.

In the drawings:—

Figure 1:
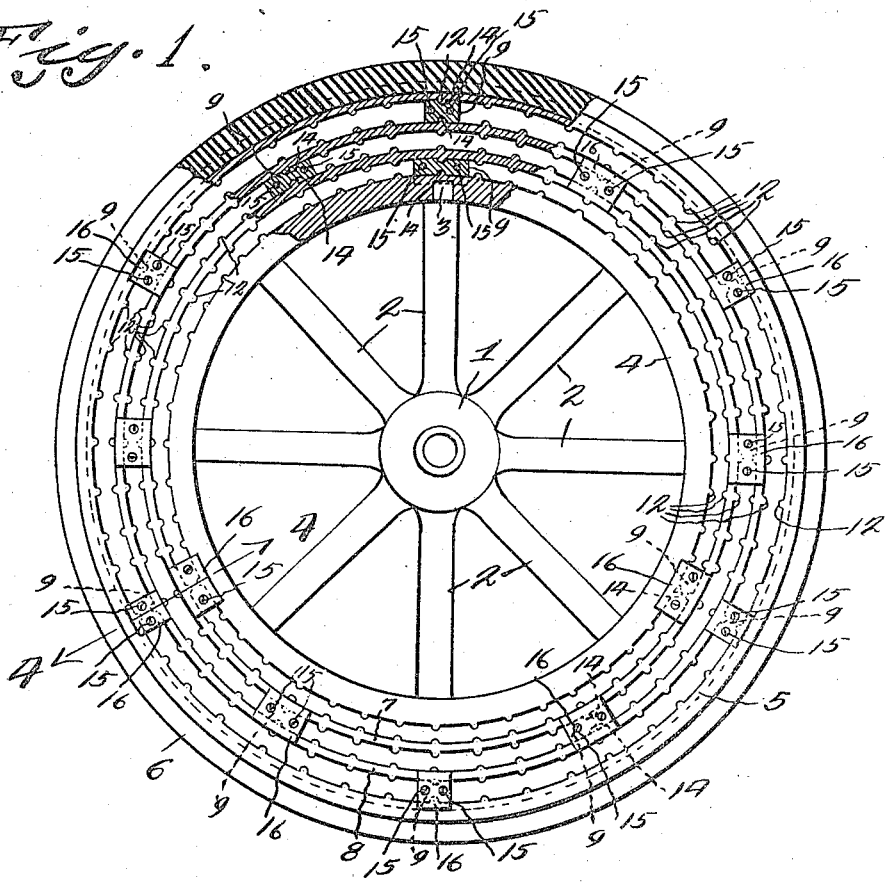
Figure 1 is a view in side elevation and partly in section, showing the spacing members capable of being adjusted in various different positions.
Figure 2:
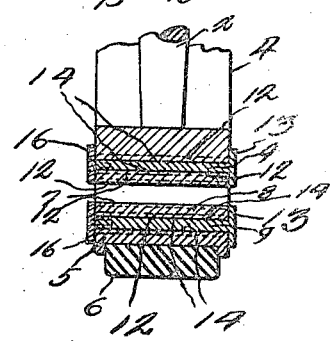
Fig. 2 is a sectional view on line 4—4 of Fig. 1.

Referring more especially to the drawings, 1 designates a conventional form of hub having the spokes 2, the reduced extremities 3 of which are secured in any suitable manner to the inner rim 4, as shown clearly in Figs. 1 and 2. The outer rim 5 is channeled in the usual manner for the reception of the usual tire 6. Arranged between the inner and outer rims are the rings 7 and 8, which are constructed of resilient spring steel, and under ordinary conditions, for instance, when the wheel is not on an axle, the various rings are concentric. Spacing members 9 are arranged between the inner and outer rims and the rings.

The inner and outer faces of the rings, the inner face of the outer rim, and the outer face of the inner rim, are provided with transverse ribs 12, arranged as shown. The spacing members are each provided with flanges 13 at one end, and each provided with grooves 14 in its inner and outer faces for the reception of the ribs 12, whereby each spacing member may be inserted from one side of the wheel or the other. Secured to one end of each spacing member by screws 15 is a plate 16, to hold the spacing members in place. It is to be noted that the plates 16 and the flanges 13 of the spacing members between the two rings overlie the rings, and the corresponding plates and flanges of the spacing members between the rings and the inner and outer rims overlie said rings and said rims, thereby preventing lateral displacement of the parts. By this construction of wheel, it may be readily seen that the spacing members may be adjusted in various different positions.

It will be noted that the spacing members can be shifted at any time to new positions, in order to bolster any part of the rings 7 and 8 that may have become weakened by continued use.

The invention having been set forth, what is claimed as new and useful is:—

In a resilient wheel, the combination with a wheel having a spoke encircling rim with uniformly spaced transverse ribs, of a rim having a tire engaging means and provided on its inner face with uniformly spaced transverse ribs, a multiple of resilient rings intervening between the aforesaid rims and having uniformly spaced transverse ribs on each of their inner and outer faces, and spacing blocks adjustable as to position and alternating with the rings and rims, said spacing blocks having means on each of their opposite faces for engaging the transverse ribs of the rings and rims and being provided with means on their ends to prevent their lateral displacement.

In testimony whereof I have signed my name to this specification in the presence of two subscribing witnesses.

JACOBUS H. DE SMIDT.

Witnesses:
  WILLIAM A. DE SMIDT,
  J. W. HUENINK.

Copies of this patent may be obtained for five cents each, by addressing the "Commissioner of Patents, Washington, D. C."